United States Patent [19]
Stoner

[11] Patent Number: 5,950,549
[45] Date of Patent: *Sep. 14, 1999

[54] TREE DIGGING APPARATUS

[76] Inventor: Glen Stoner, 11982 W. Green Hill Rd., McMinnville, Tenn. 37110

[ * ] Notice: This patent is subject to a terminal disclaimer.

[21] Appl. No.: 09/186,294

[22] Filed: Nov. 5, 1998

Related U.S. Application Data

[63] Continuation-in-part of application No. 08/991,576, Dec. 16, 1997.

[51] Int. Cl.⁶ .................................................... A01G 23/04
[52] U.S. Cl. .............................................. 111/101; 37/302
[58] Field of Search ........................... 37/301, 302, 403; 111/101, 102; 171/50, 53, 54, 55, 56, 59, 62; 414/697

[56] References Cited

U.S. PATENT DOCUMENTS 4,305,213 12/1981 Pelham .
4,445,557 5/1984 Peters, III .
4,676,013 6/1987 Endo .

*Primary Examiner*—Robert E. Pezzuto
*Attorney, Agent, or Firm*—Harpman & Harpman

[57] ABSTRACT

An apparatus for continuous field digging and cleaning of nursery trees for transplanting comprises; a support frame pulled by a tractor with a fixed ground engagement digging blade and a pivoted removal and treatment basket extending therefrom. A powered eccentric drive arm secured to the basket oscillating same within a confined range of movement so as to expose and free the tree root system from the surrounding earth during operation.

11 Claims, 11 Drawing Sheets

TREE DIGGING APPARATUS

This is a continuation in part patent application of Ser. No. 08/991,576, filed Dec. 16, 1997, now pending.

BACKGROUND OF THE INVENTION

1. Technical Field

This device relates to tree digging equipment that is used to dig and remove small nursery grown trees for transplanting and sale. Such devices typically have a digging blade or blades that are engaged into the ground by hydraulic means or pulled along behind a tractor like a plow.

2. Description of Prior Art

These types of devices typically have a variety of different removal techniques in which sometimes the blade is oscillated as it digs and is connected to a following basket that separates the tree roots from the earthen root ball as the tree is dug.

The problem associated with such prior art devices is two-fold, the first being the ability of the blade and attached basket assembly to dig and separate the roots from the earth in efficient and continuous manner.

Secondly, the nature of such devices imparts long term stress to the tractor due in part to the forces required by the oscillating blade as it engages the ground. Also many of such prior art devices use direct power take-offs from the tractor to drive the blade and basket which becomes an additional safety factor as well as additional maintenance required on the power take-off system, see U.S. Pat. Nos. 4,445,557, 4,676,013, 4,305,213 and conventionally available diggers illustrated in catalog sheets and advertising pages manufactured by Egedal Maskinfabrik A/S, Exhibit A and such devices manufactured by Pioneer Metal Works of Quincy, Washington, titled "Lil Digger", Exhibit B.

OBJECTS AND ADVANTAGES

Accordingly, it is an object of the present invention to provide a combination tree digging and root cleaning device that utilizes a fixed digging blade on a dual support frame assembly with a pivoting shaker basket extending therefrom that is oscillated by an onboard hydraulic motor and cam assembly. The present invention is accordingly tractor friendly with reduced stress imparted to the tractor while providing superior digging and root cleaning device that digs, guides and separates the tree roots in one continuous self-contained action.

SUMMARY OF THE INVENTION

A tree digging device generally comprising; a support frame with a fixed digging blade extending therefrom. A guide and root separation basket pivotally secured thereto. An oscillation device supporting the basket for removal of dirt from the tree roots providing a self-contained digging apparatus that is secured to a tractor.

DESCRIPTION OF THE PREFERRED EMBODIMENT

Figure 1:
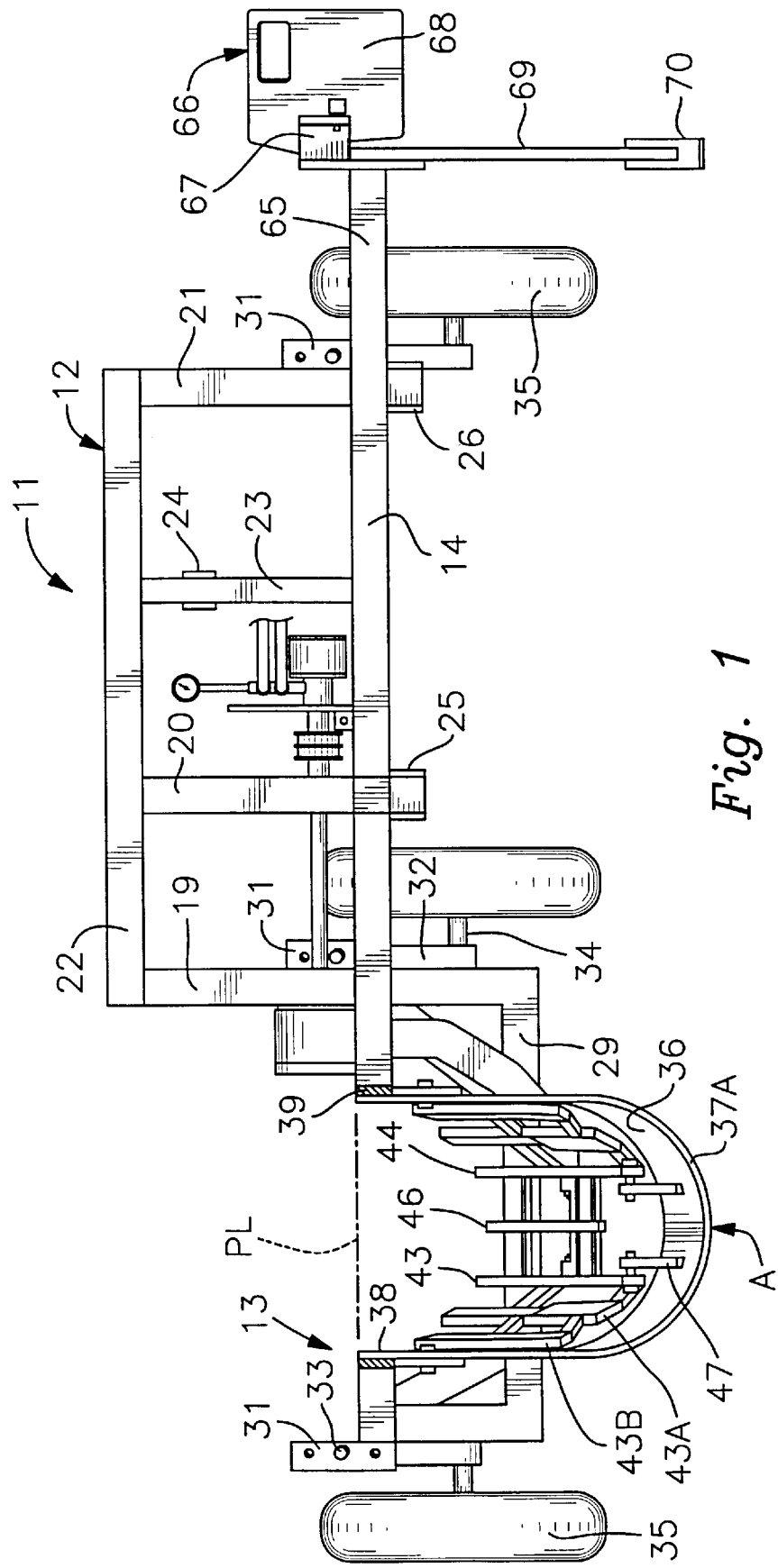
FIG. 1 is a front elevational view of the apparatus of the invention.
Figure 2:
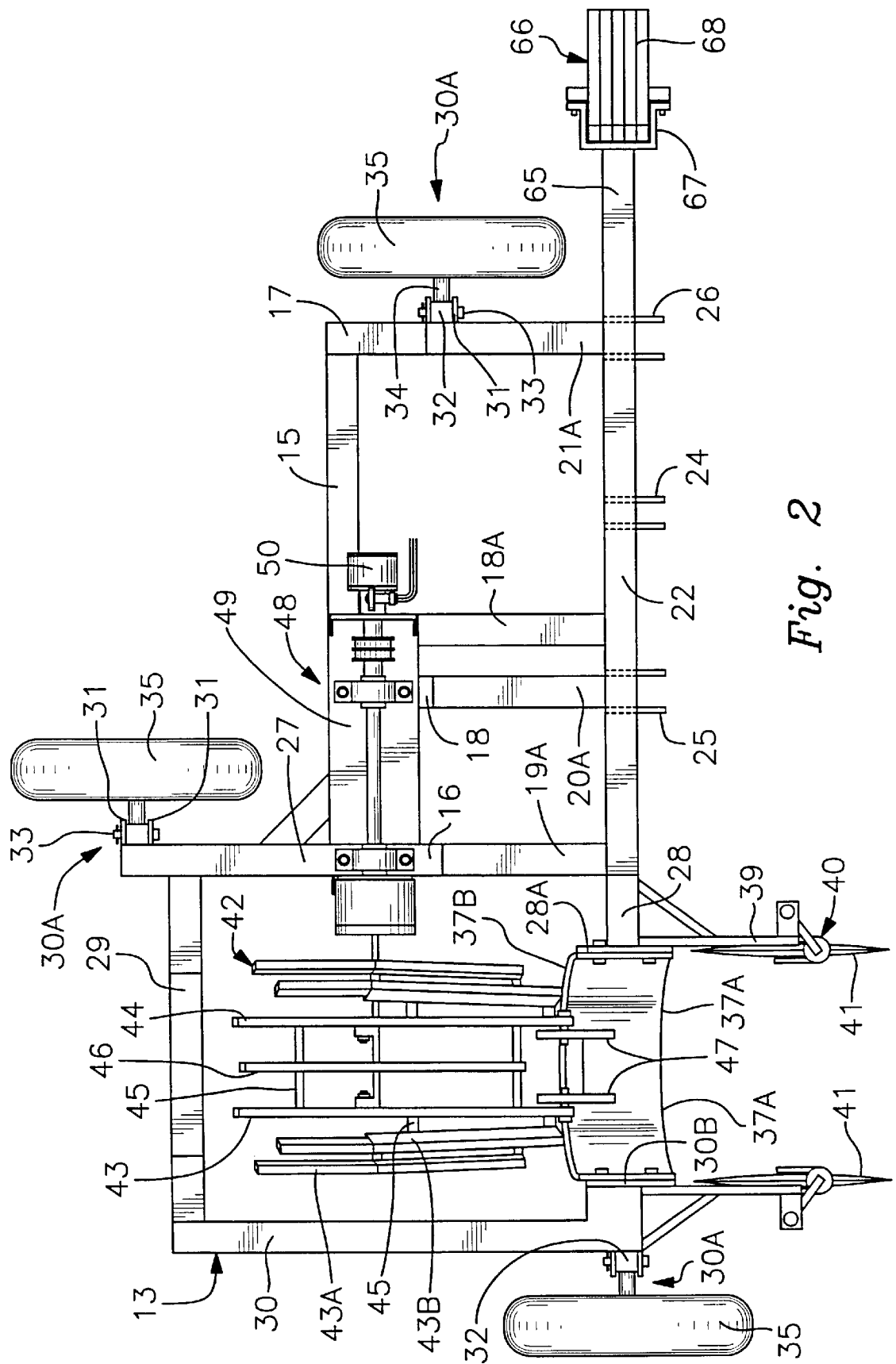
FIG. 2 is a top plan view of the invention.
Figure 3:
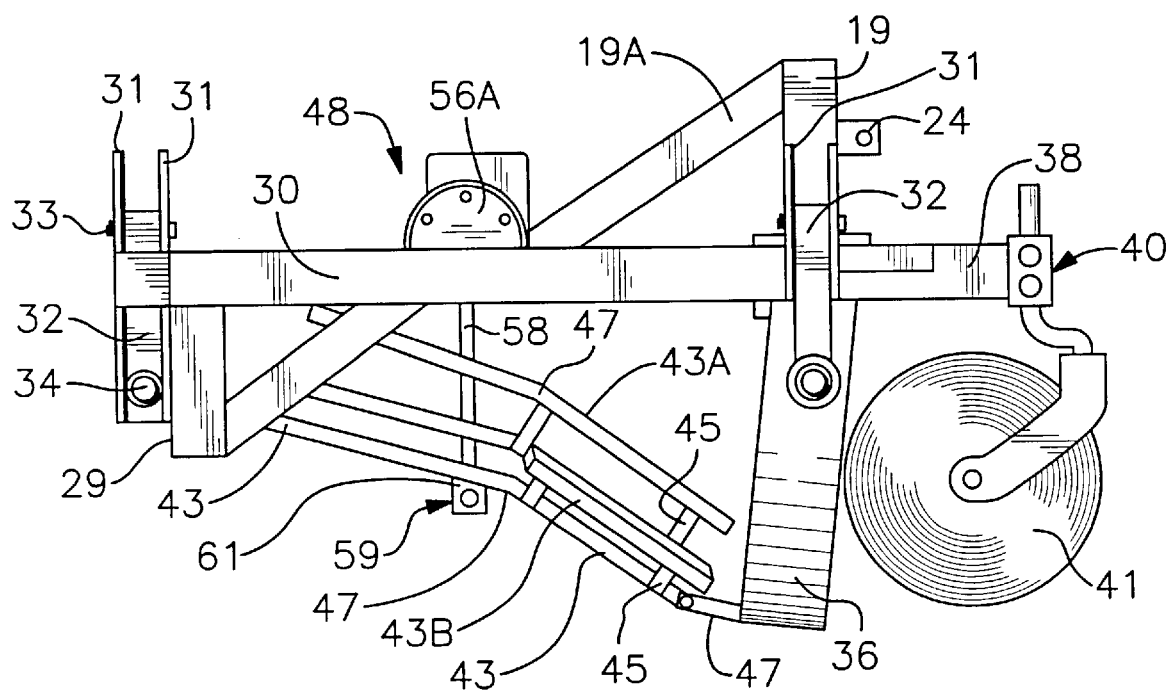
FIG. 3 is an end elevational view of the invention.

Referring to FIGS. 1, 2 and 3 of the drawings, a tree digging and separation device can be seen having a main support frame 11 defining an attachment and a drive portion 12 and a blade support portion 13. The attachment and drive portion 12 has a generally rectangular frame base with outwardly extending front frame element 14 and a rear frame element 15. The front and rear frame elements are interconnected by a pair of oppositely disposed end frame elements 16 and 17 and intermediate frame elements 18 & 18A. A plurality of vertically upstanding frame elements 19, 20 and 21 extend from said front frame element 14 corresponding to said hereinbefore described interconnecting elements 16 and 17. A secondary front frame element 22 overlies the free ends of said upstanding frame elements 19–21 with angularly positioned support members 19A, 20A and 21A interconnecting the secondary front frame element 22 with the respective interconnecting elements 16, 17 and 18A as will be well understood by those skilled in the art.

An intermediate brace 23 extends between the front frame element 14 and the secondary front frame element 22 from which extends a hitch bracket 24. A pair of secondary hitch brackets 25 and 26 extend from and below the front frame element 14 in alignment with said respective upstanding front elements 20 and 21 as best seen in FIGS. 1 and 2 of the drawings defining a typical three point hitch for engagement with a farm tractor other like device (not shown).

The blade support portion 13 extends from the attachment and drive portion 12 by extensions of the end frame element 16 at 27 and front frame element 14 at 28. A cross support rear frame element 29 extends at right angles from said frame extension 27 interconnected to a secondary end frame element 30 in spaced parallel relation thereto.

Wheel assemblies 30A are secured to the frame digging portion 13 on the ends of the respective frame extension element 27 and the free end of the secondary end frame element 30 and to the attachment and drive portion 12 on the juncture of the end frame 17 between the rear frame element 15 and front frame element 14. Each of the wheel assemblies 30A have a pair of apertured spaced parallel guide brackets 31 with a apertured wheel axle mounting element 32 movably positioned therebetween. A release pin 33 extends through the aligned apertured guide brackets 31 and intervening wheel axle mounting element 32 adjustably securing same as will be well understood by those skilled in the art. A wheel axle bearing assembly 34 extends from the axle mounting element 32 with a wheel and tire assembly 35 thereon. As will be discussed in greater detail by adjusting the wheel assemblies 30A the determination of the engagement depth of the digging device is achieved.

Referring now to the digging frame portion 13, a ground engagement blade 36 extends between frame element extension 28 and the secondary end frame element 30 from respective mounting plates 28A and 30B. The blade 36 is of a U-shaped transversely flat metal band configuration having a leading engagement edge 37A and a trailing edge 37B and correspondingly extends well below the horizontal plane line PL of the front frame element 14 as illustrated in broken lines in FIG. 1 of the drawings. A pair of oppositely disposed spaced parallel support arms 38 and 39 extend from the digging frame portion 13 adjacent the blade mounts 28A and 30B. Each of the support arms 38 and 39 have an adjustable disk mounting assembly 40 on their respective free ends to position and support a cutting disk 41 in forward alignment with the respective blade mounting plates 28A and 30B. It will be evident from the above description that as such cutting disks 41 engage the ground G in the blade path BP before the blade 36 cutting any ancillary vegetation, as best seen in FIGS. 7 and 8 of the drawings.

Figure 7:
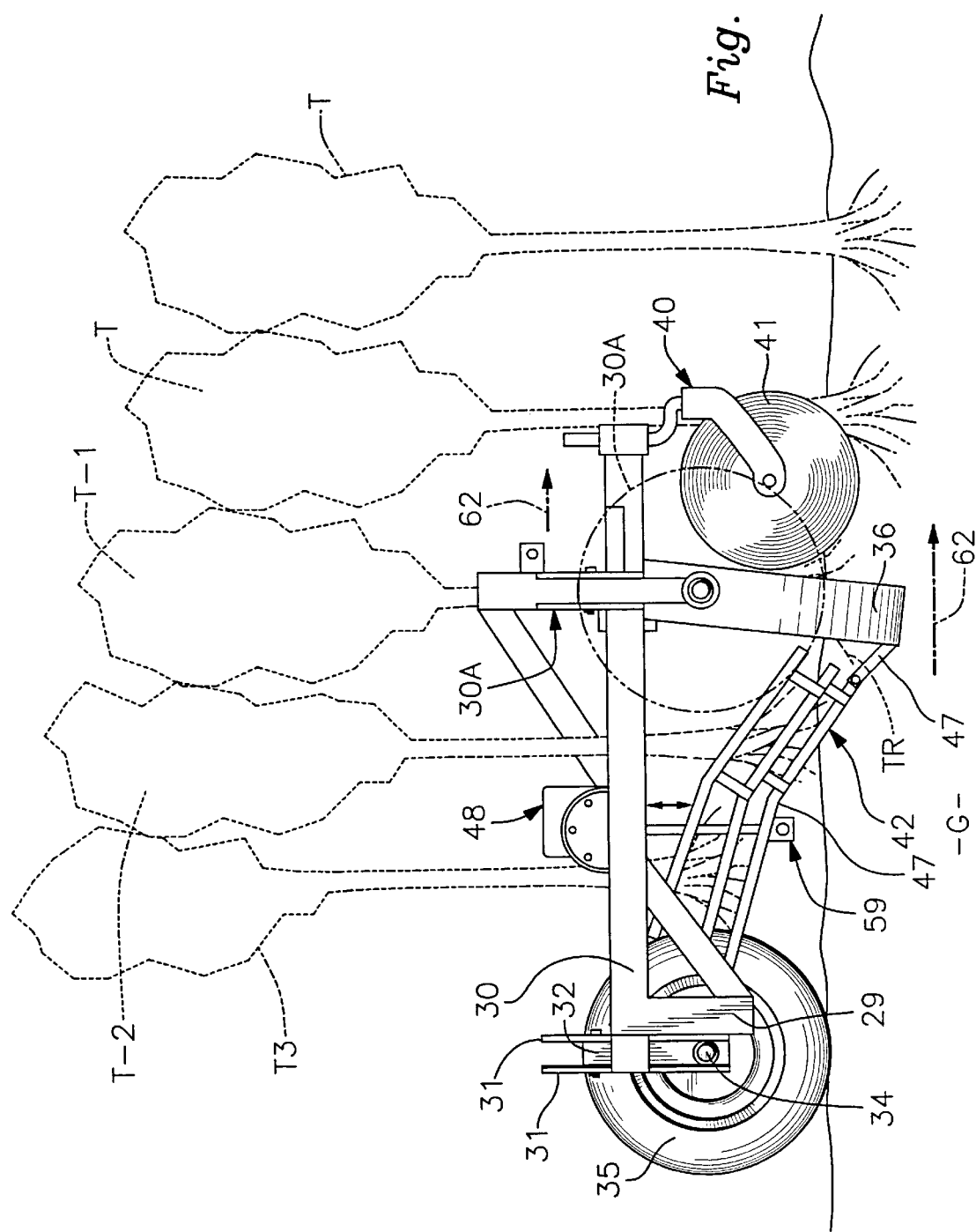
FIG. 7 is a side elevational view of the invention in use behind a tractor (not shown)
Figure 8:
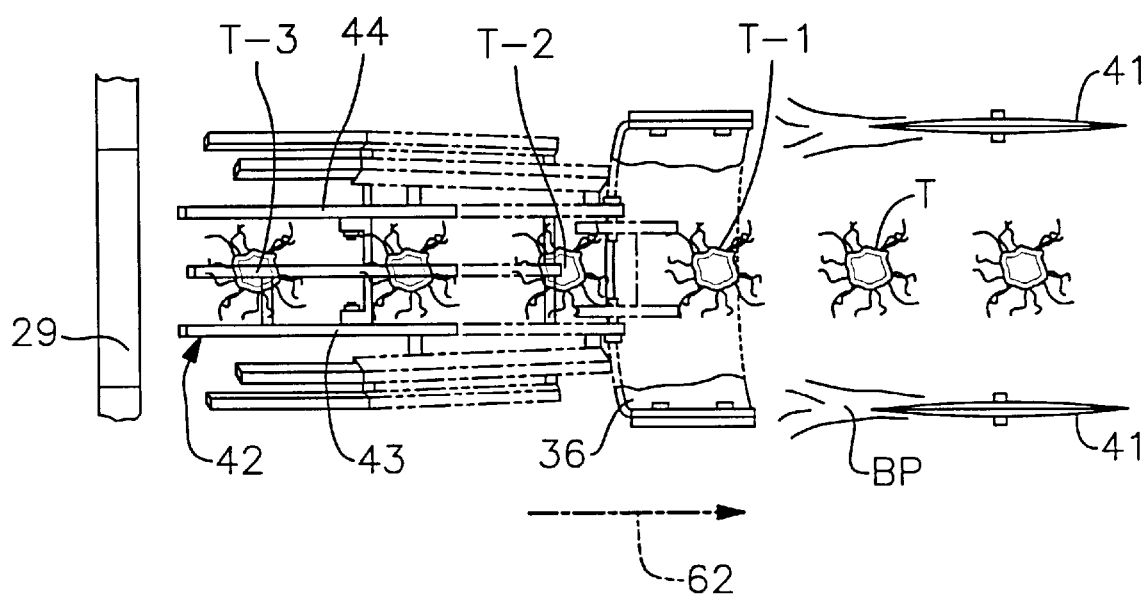
FIG. 8 is a graphic illustration of the functional path of the tree digging device of the invention in use.

The blade 36 itself has a slight angular offset to vertical, best seen in FIG. 7 of the drawings, to engage and lift the ground G within the confines of the blade configuration in use. A retrieval and processing basket 42 is positioned within the blade support portion 13 having longitudinally extending spaced parallel multiple support bars 43 and 44 interconnected by transversely extending support rods 45 with an intermittent parallel bar 46 as best seen in FIG. 2 of the drawings. A pair of transition guide bars 47 are pivotally connected to the respective free ends of said support bars 43 and 44 and are affixed to the trailing edge 37B of the blade 36. Each of the support bars 43 and 44 have a pair of vertically spaced guide side rails 43A and 43B and 44A and 44B respectively extending in spaced parallel relation therefrom by pairs of bar stubs 45 therebetween. Accordingly, the vertically spaced ascending side rails 43A and 43B, 44A and 44B define an arcuate enclosure extending between the apex A of the blade 36 to a point that is above the horizontal plane of the cross support rear frame element 29 which is offset below the adjacent frame members 27–30 as best seen in FIG. 3 of the drawings.

The guide side rails 43B and 44B are angularly offset with the rails 44A and 44B extending in angular offset spaced vertical relation therefrom. It will be further seen that the multiple support bars 43, 44 and 46 and respective pairs of upstanding guide rails 43A and 43B and 44A and 44B are angularly inclined at transition points 47 thereby changing the angular inclination of the basket 42 as it extends between the blade 36 and the rear frame element 29 as hereinbefore described and best seen in FIG. 3 of the drawings.

The change in angular inclination at 47 is required due to the relative depth of the digging blade 36 and the offset nature of the rear frame element 29. This provides for ease of tree removal as will be described in greater detail hereinafter.

Referring now to FIGS. 1–6 of the drawings, an oscillating drive assembly 48 can be seen secured to the attachment and drive portion 12 along the rear frame element 15 between the front element 14 and intermediate frame element 18 on a support mounting plate 49. The oscillation drive assembly 48 comprises a hydraulic motor 50 with a chain driven drive shaft 51. A pair of bearing blocks 52 and 53 support the drive shaft 51 on the main support frame. An eccentric cam assembly 54 is mounted on the free end of the drive shaft 51 having a cam block 55 on the drive shaft 51 on which is positioned a crank housing 56 by a pair of oppositely disposed tapered roller bearings 57, best seen in FIG. 6 of the drawings. The crank housing 56 has respective end caps 56A and 56B to provide a seal for the assembly.

Figure 4:
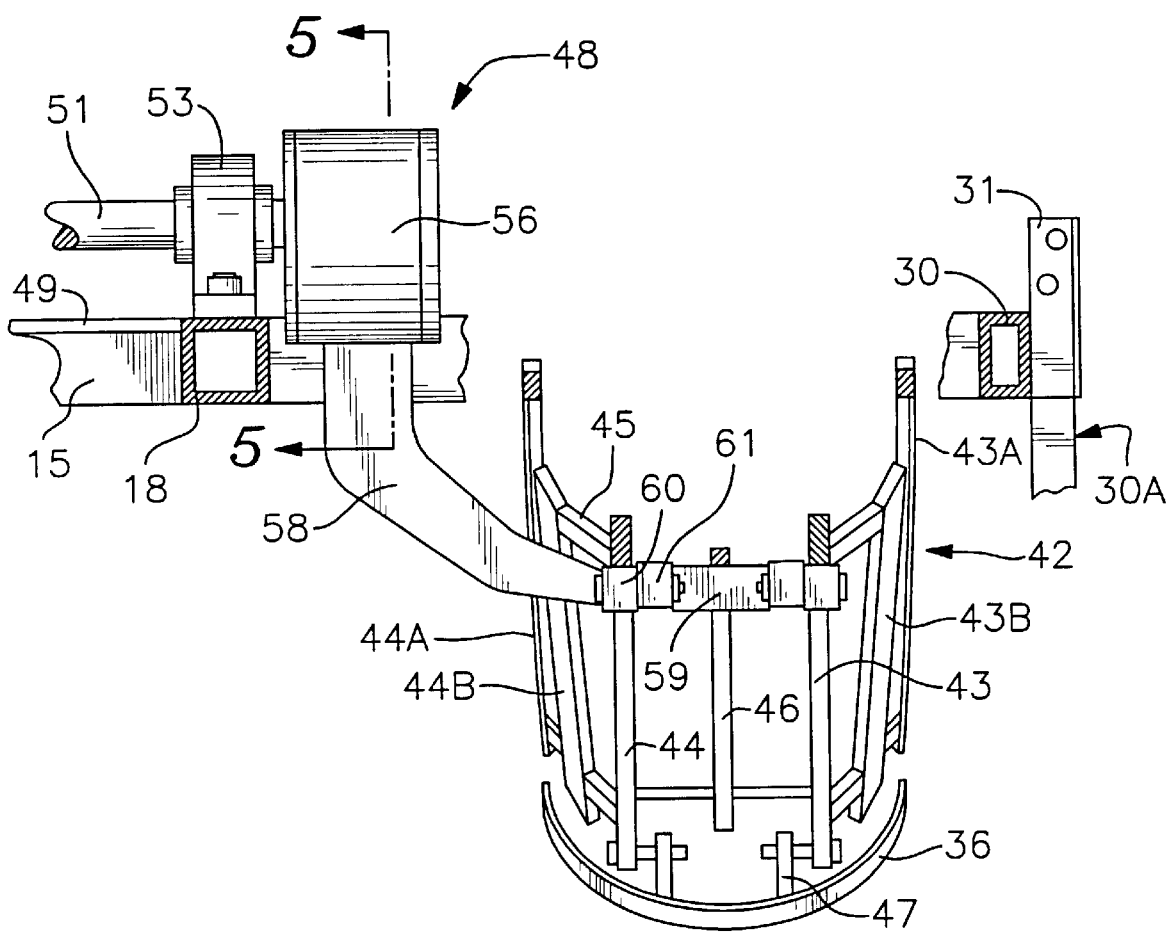
FIG. 4 is an enlarged partial elevated view with portions broken away for clarity.
Figure 5:
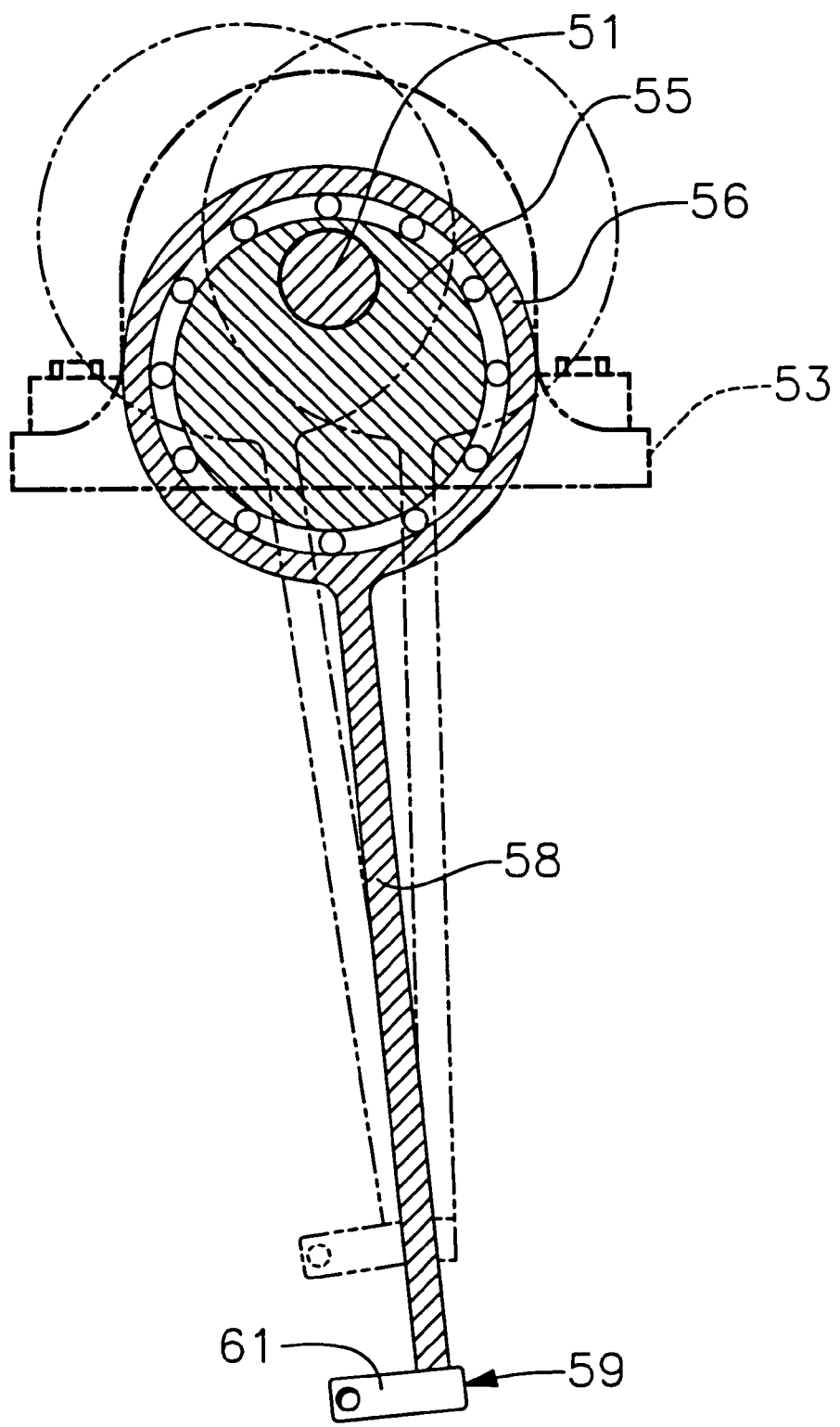
FIG. 5 is an enlarged sectional view of the oscillation cam assembly of the invention.
Figure 6:
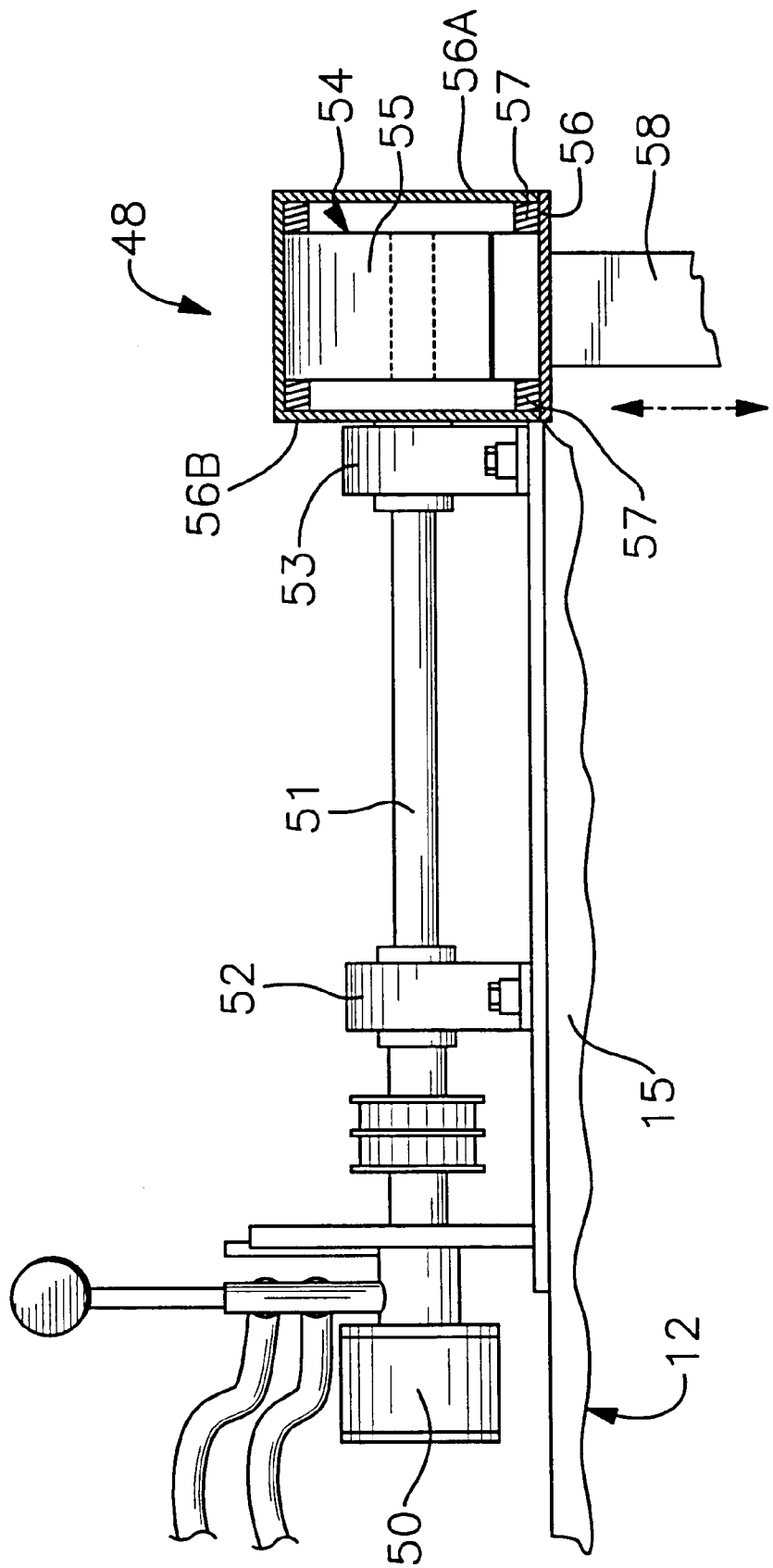
FIG. 6 is an enlarged side elevational view of the drive assembly with portions in sectional view.

A crank arm 58 extends integrally from the housing 56 with an extension portion that terminates in a basket mounting block 59 below the hereinbefore described basket 42, best seen in FIG. 4 of the drawings. The mounting block 59 has apertured lugs 60 aligned with respective apertured basket mounting tabs 61 with registerable fasteners F that extend therethrough.

It will be evident from the above description that as the drive shaft 51 rotates, the cam block 55 will oscillate the crank housing 56 and attached crank arm 58, thus imparting a rapid shaking motion to the attached basket 42 that pivots from the blade 36 as hereinbefore described.

Referring now to FIG. 7 of the drawings, the tree digging device of the invention can be seen in operation to be pulled by a mechanized farm machinery, not shown, indicated by directional arrow at 62. As the digging device of the invention moves forward the blade 36 is engaged in the ground G to a depth determined by the adjustable wheel assemblies 30. The blade 36 extends below and to the respective sides of a nursery tree T-1 shown in broken lines and about the tree roots T-R. As the digger progresses a root ball is formed about the tree illustrated at T-2 beyond the trailing edge 37B of the blade 36 within the vertically oscillating basket 42. As the tree and its root ball is advanced in the basket by the next tree the dirt is removed from the root ball by the shaking and sifting action imparted thereto by the basket 42 by interconnected oscillation drive assembly 48 delivering a bare root tree illustrated at T-3 for removal at the opposite end of the basket 42 adjacent the rear frame element 29.

Thus it will be seen that during use that the change in angular inclination at 47 and angular side rails 43AB and 44AB are critical to maintain the tree within the basket 42 and remove the dirt about the root ball RB by the sifting action of the basket cleanly separating the tree roots from the sole without any additional cleaning of the tree roots heretofore required. It will also be apparent that by supporting the blade 36 at the mounting plate 30A on the secondary end frame element 30 will assure that the blade 36 is stable by transferring the imparted load force of the ground G back through the cross support rear frame element 29 to the main support frame characterized by the attachment and drive portion 12 as hereinbefore described.

Referring back to FIGS. 1 and 2 of the drawings, it will be seen that as the front frame element 14 extends beyond the intersection of the end frame element 17 it defines an extension element 65 having an adjustable counter weight assembly 66 on its free end thereof. The counter weight assembly 66 is of a type typically found on farm tractors with a mounting bracket 67 having and a plurality of removably positioned counter weights 68 within. The counter weight is used to co-balance out the support frame of the invention offsetting the weight of the digging portion 13 as hereinbefore described. An outboard ground engagement arm 69 extends from the assembly 66 at a 90 degree angle to said front frame element 65. The ground engagement arm 69 has an ground engaging shoe 70 on its free end with the arm 69 and ground engaging shoe 70 providing a cross-counter ground anchor to offset the implicit torsional torque imparted to the tree digging device as the blade 36 and attached oscillating basket 42 is pulled through the ground G during the digging process. The ground engagement arm 69 resist the digging device of the invention's tendency to twist under the hereinbefore described loads.

Figure 9:
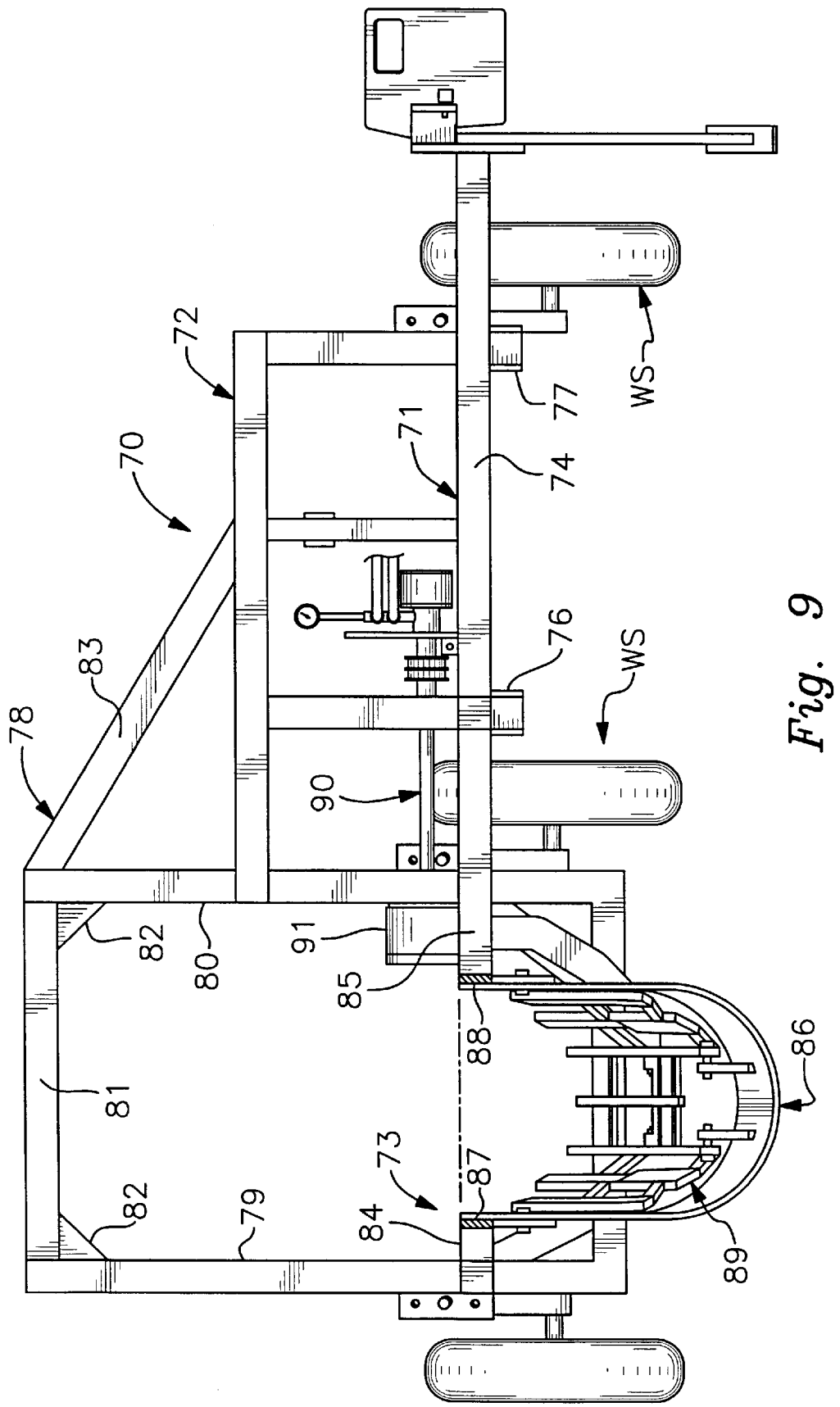
FIG. 9 is a front elevational view of an alternate form of the invention having an overhead support frame.
Figure 10:
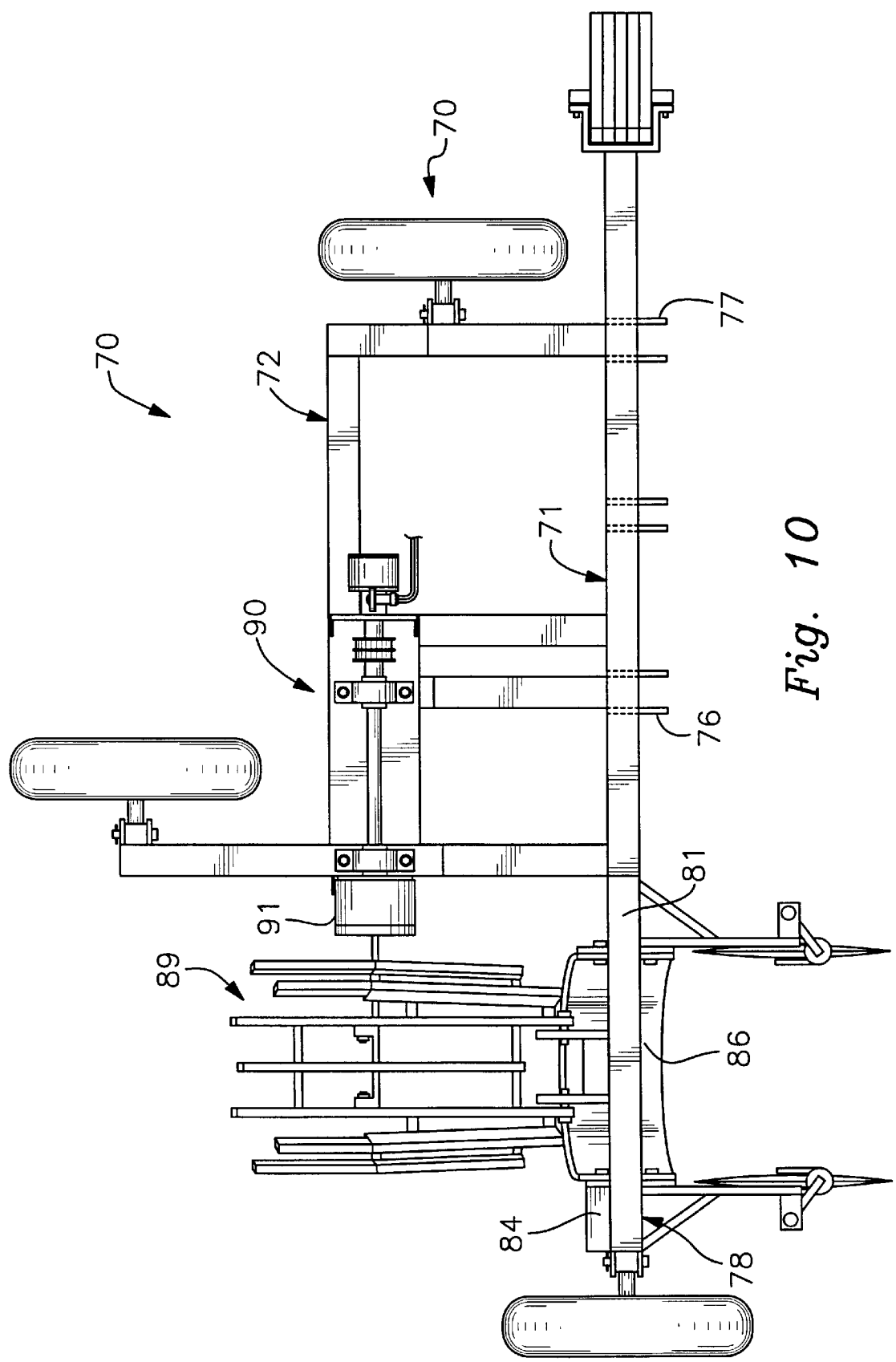
FIG. 10 is a top plan view of the alternate form of the invention shown in FIG. 9.
Figure 11:
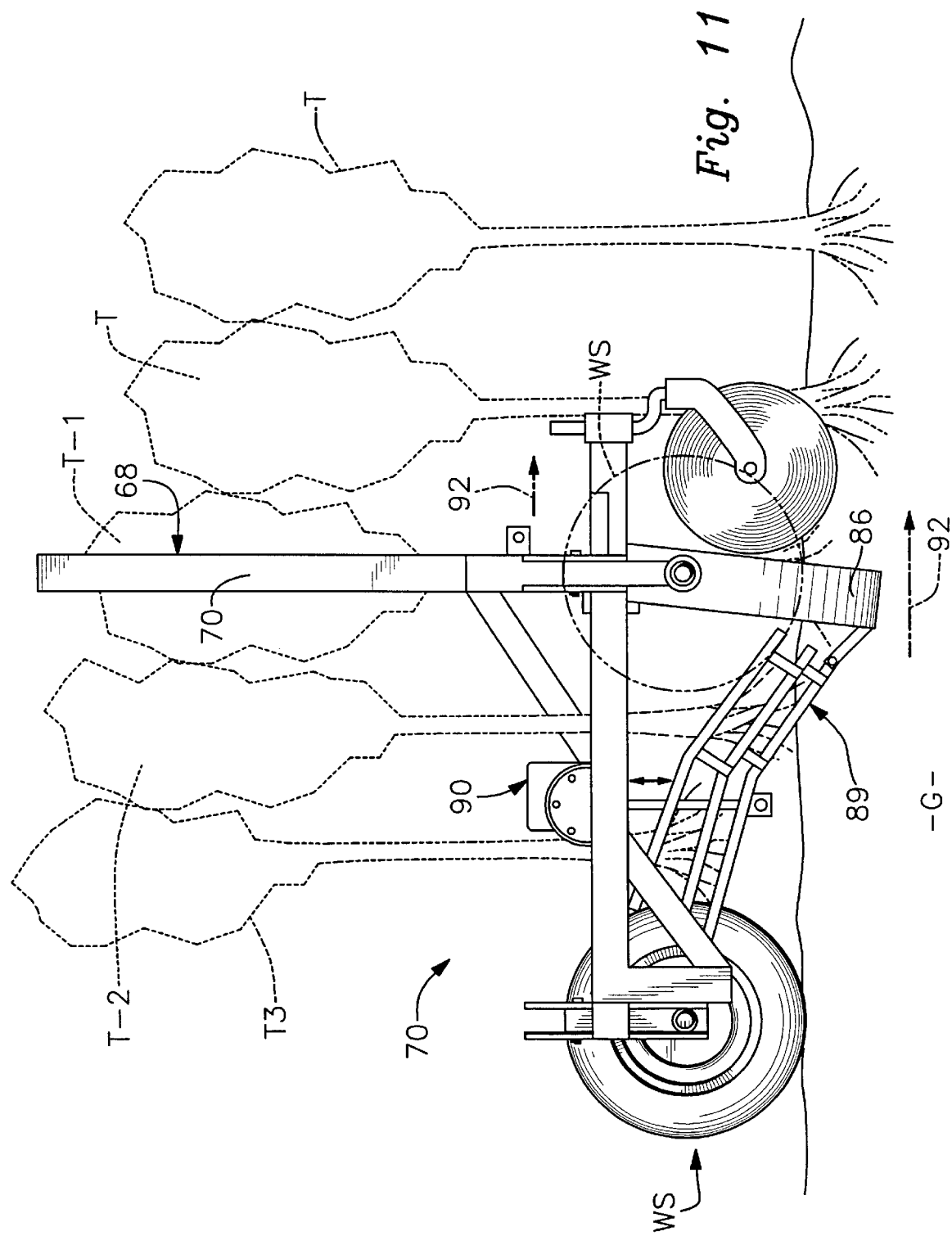
FIG. 11 is a side elevational view of the alternate form of the invention shown in FIG. 9.

Referring now to FIGS. 9, 10, and 11 of the drawings, a tree digging and separating device 70 can be seen having a main support frame 71 defining an attachment and drive portion 72 and a blade support portion 73. The attachment and drive portion 72 has a generally rectangular frame base without extending front frame element 74 and a rear frame element 75. A pair of secondary hitch brackets 76 and 77 extend from and below the front frame element 74 defining a typical three point hitch for engagement with a farm tractor or other like devices (not shown).

The blade support portion 73 extends from the attachment and drive portion 72 by extension of an overhead frame 78, having a pair of oppositely disposed parallel upstanding frame elements 79 and 80 interconnected by a cross frame element 81 and interior support gusses at 82 respectively. An angled support frame element 83 extends from the cross frame element 81 back to main frame 71. Frame element extensions 84 and 85 extend from the upstanding frame element 79 and front frame element 74.

Wheel assembles WS are secured to the frame at multiple locations which will be well understood by those skilled in the art and as hereinbefore described in the primary form of the invention.

A ground engagement blade 86 extends between frame element extension 84 and 85 from their respective mounting plates 87 and 88. The blade 86 is of a U-shaped transversely flat metal band configuration having a slight angular offset to vertical to engage and lift the ground G within the confines of the blade configuration in use. A retrieval and processing basket 89 extends from the blade 86 as hereinbefore described with an oscillating drive assembly 90 that is secured through the attachment and drive portion 72 along the rear frame element 75. The oscillating drive assembly has an eccentric cam assembly 91 interconnected to the basket 89 for oscillation thereof during use.

Referring now to FIG. 11 of the drawings, the alternate digging and separation device 70 of the invention can be seen in operation to be pulled by a mechanized farm machinery, not shown, indicated by the directional arrow at 92. As the digging device of the invention moves forward the blade 86 is engaged in the ground G to a depth determined by the adjustable wheel assemblies WS. The blade 86 extends below and to the respective sides of a nursery tree T-1 shown in broken lines and about the tree roots T-R. As the digger progresses a root ball is formed about the tree illustrated at T-2 within the vertical oscillating basket 89. As the tree and its root ball is advanced in the basket 89 by the next tree, the dirt is removed from the root ball by shaking and shifting action imparted thereto by the basket 89 by the interconnecting oscillating drive assembly 90 delivering a bare root tree illustrated at T-3 for removal at the opposite end of the basket 76.

The alternate form of the tree digging and stacking device 70 of the invention provides the overhead frame 78 assembly to support the digging blade 86 while allowing clearance for trees T-1 to pass thereunder.

It will thus be seen that a new and novel tree digging device for nursery trees has been illustrated and described and it will be apparent to those skilled in the art that various changes and modifications may be made therein without departing from the spirit of the invention.

Therefore I claim:

1. A tree digging device for use in continuously removing a row of trees from the ground comprising; a main support frame, a blade support portion extending therefrom, a U-shaped blade secured within said blade support portion and extending therebeyond so as to be engageable into and through the ground under the row of trees, a separation basket extending from said blade, means on said blade support portion for engaging the ground in spaced alignment with said blade, said blade support portion extending in spaced vertical relation to said U-shaped blade, means for oscillating said separation basket independently from said blade and said main support frame and said blade support portion, means for adjustably positioning said main support frame and blade support portion in spaced vertical relation to the ground, means on said main support frame for removably securing said main support frame to a self-powered pulling vehicle.

2. The tree digging device set forth in claim 1 wherein said main support frame has an attachment and drive portion.

3. The tree digging device set forth in claim 1 wherein said separation basket comprises; multiple support bars pivotally extending from transition guide bars secured to said U-shaped blade, pairs of guide side rails extending vertically from said multiple support bars in angular relation thereto.

4. The tree digging device set forth in claim 1 wherein said means for oscillating said basket comprises; a cam block rotatably positioned on a drive shaft, a crank arm extending from said cam block and secured to said separation basket, a drive motor in communication with said drive shaft and a source of power for said drive motor.

5. The tree digging device set forth in claim 1 further comprises an extension element on said main support frame, an adjustable weight on the end of said extension element.

6. The tree digging device set forth in claim 1 wherein said means for adjustably positioning said main support frame in spaced vertical relation with said ground comprises; multiple wheel assemblies.

7. The tree digging device set forth in claim 6 wherein said wheel assemblies comprises apertured guide brackets, a wheel support arm adjustably positioned between said brackets, an axle bearing and wheel assembly on said wheel support arm and a tire on said wheel assembly.

8. The tree digging device set forth in claim 1 wherein said means on said main support frame for removably securing said main support frame to a self-powered pulling vehicle comprises; a three point hitch on main support frame.

9. The tree digging device set forth in claim 1 wherein said U-shaped blade is fixed and angularly inclined from a vertical.

10. The tree digging device set forth in claim 1 wherein said blade support portion comprises; a pair of spaced parallel upstanding frame elements, and an interconnecting frame element extending therebetween, and angular support elements extending therefrom to said main support frame.

11. The tree digging device set forth in claim 1 wherein said means on said blade support portion for engaging the ground in spaced alignment with said blade comprises; a pair of ground engaging cutting disks.

* * * * *